W. D. HEFLIN.
PLANTER.
APPLICATION FILED FEB. 18, 1916.
1,212,946.
Patented Jan. 16, 1917.
2 SHEETS—SHEET 1.
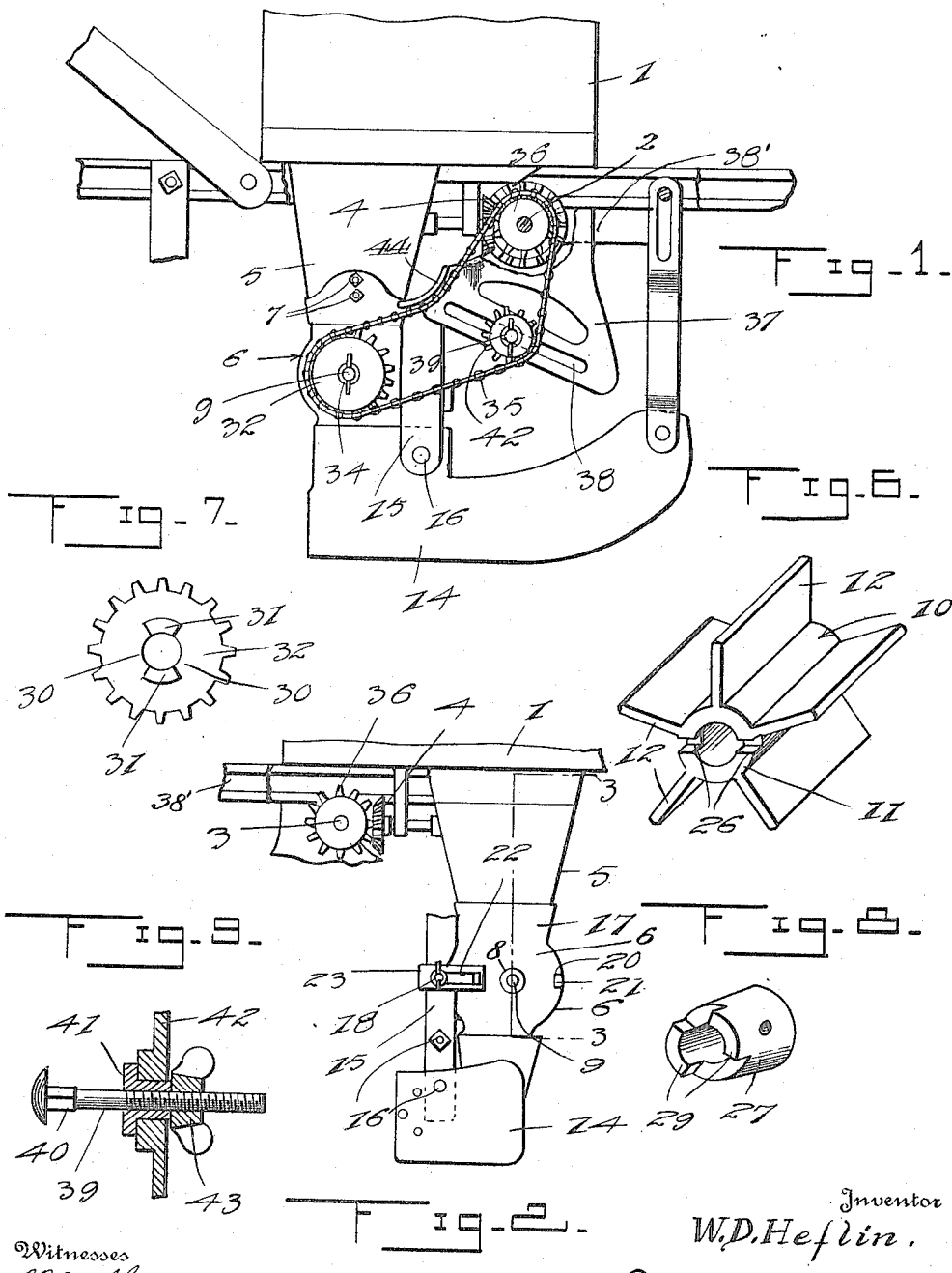
Witnesses
Inventor
W. D. Heflin.
By
Attorney

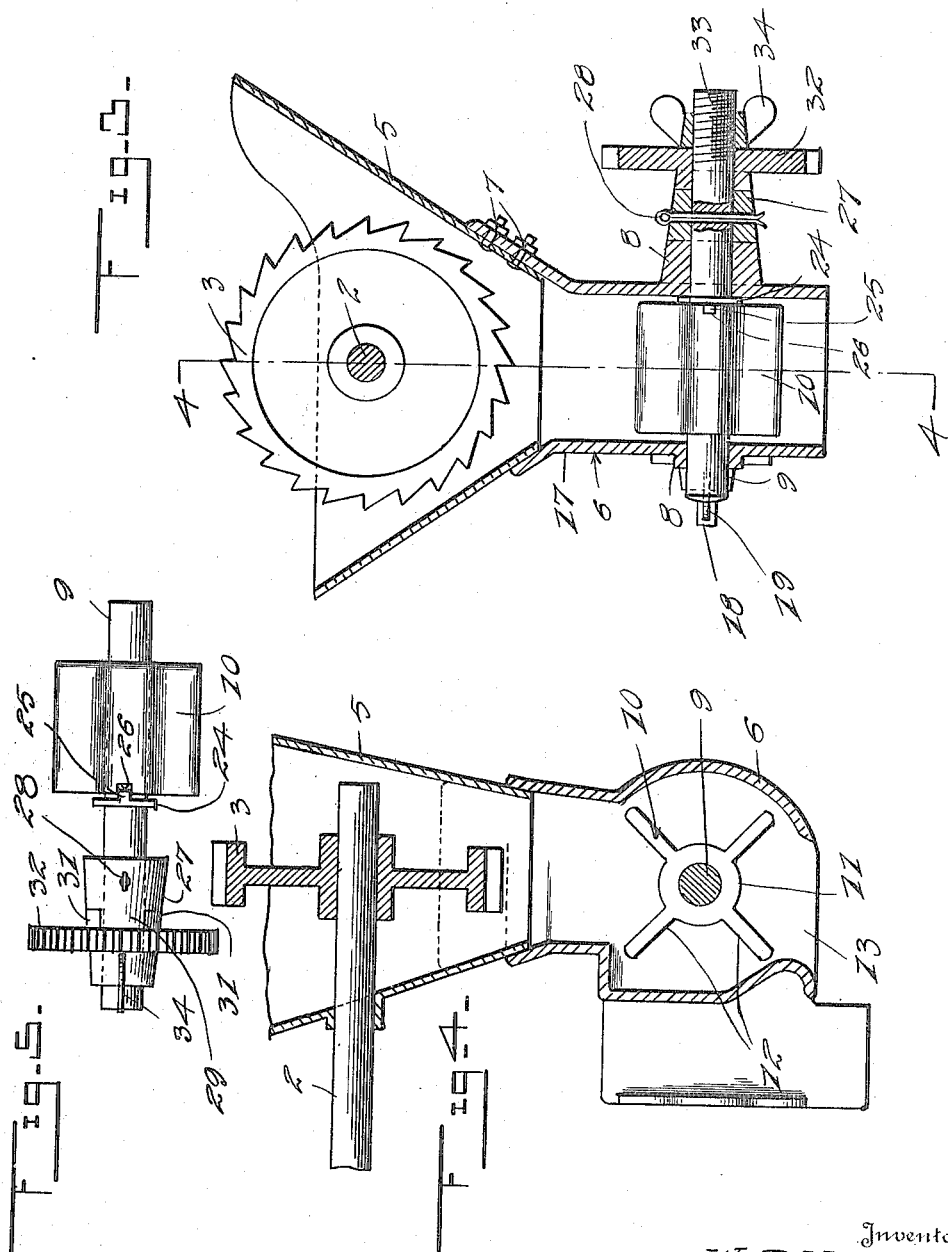

UNITED STATES PATENT OFFICE.

WILLIAM D. HEFLIN, OF SARDIS, MISSISSIPPI.

PLANTER.

1,212,946.  Specification of Letters Patent.  Patented Jan. 16, 1917.

Application filed February 18, 1916. Serial No. 79,159.

*To all whom it may concern:*

Be it known that I, WILLIAM D. HEFLIN, a citizen of the United States, residing at Sardis, in the county of Panola and State of Mississippi, have invented certain new and useful Improvements in Planters; and I do hereby declare the following to be a full, clear, and exact description of the invention, such as will enable others skilled in the art to which it appertains to make and use the same.

This invention relates to an attachment for grain drills or planters, and the primary object of the invention is to provide an attachment for a corn or cotton planter which is particularly designed for planting cotton in hills, a predetermined distance apart so as to eliminate to a great extent the necessity of hoeing or chopping out the cotton plants to obtain the proper stand.

Another object of this invention is to provide an attachment as specified which is mounted beneath the seed dispensing structure of the planter, and includes a rotary valve member which receives the seed from the dispensing structure of the planter and deposits it at predetermined times during the travel or operation of the planter and further to provide means for operating the valve by the operation of the seed dispensing mechanism.

A further object of this invention is to provide a structure for transmitting the power from the seed dispensing structure to the regulating valve structure which forms this invention, which means may be adjusted for regulating the operation of the rotary valve member for regulating the distance between the hills of the seed dropped.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved planter attachment showing it attached to a part of a corn planter. Fig. 2 is a side elevation of the attachment illustrating the opposite side from that which is illustrated in Fig. 1. Fig. 3 is a vertical section through the attachment. Fig. 4 is a vertical section through the attachment taken at right angles to the section illustrated in Fig. 3. Fig. 5 is a detail view of the rotary valve showing its supporting shaft and a portion of its driving mechanism. Fig. 6 is a detail perspective view of one of the rotary valve members. Fig. 7 is a detail view of a sprocket used in the construction of the attachment for driving the rotary valve member. Fig. 8 is a detail perspective view of a clutch collar which is carried by the valve carrying shaft and is adapted for operative connection with the sprocket illustrated in Fig. 7, and Fig. 9 is a detail view of a part of the planter attachment structure.

Referring more particularly to the drawings, 1 designates the seed retaining hopper of an ordinary planter, and 2 indicates the seed dispensing mechanism operating shaft, upon which is mounted the usual seed dispensing wheel. The shaft 2 is operatively connected to a drive shaft 3, in any ordinary manner, and the shaft 3 is connected through the medium of a power transmitting mechanism 4 to the front supporting wheel of the planter (not shown). The attachment as shown in the drawings is particularly designed for use in connection with a walking corn or cotton planter carrying a cross shaft beneath a feed hopper but it is to be understood that the valve mechanism of the spout can be operated direct from the drive shaft and the spout can be used in connection with any two-row planter if it is so desired. The improved attachment, includes a spout 5 which replaces the ordinary delivery spouts of corn or cotton planters of this type.

The lower delivery end of the spout 5 is connected to a casing 6, as is shown at 7. The casing 6 is provided with bearings 8 formed upon its sides which rotatably support a shaft 9. The shaft 9 extends through the casing 6 and it has a valve member 10 mounted thereon. The valve member 10 comprises a hub 11, which has a plurality of radiating blades 12 formed thereon. The number of the blades 12 may vary, depending upon the desired distance between the hills planted. The lower portion of the casing 6 is open as is shown at 13, which permits the seed after they have been dispensed by the rotary valve member 10 to fall downwardly between the blade 14 of the ordinary furrow opening shoe of the planter. An arm or extension 15 is bolted, as shown at 16 to the furrow opening shoe of the planter. The side 17 of the box or casing 6 is detachably connected, by means of a bolt 18 and wing nut 19 to the extension 15 which bolt extends through a slot 22 formed in an extension 23 which is formed upon the side 17. The side 17 is provided with a notch 20 which receives an outstanding lug 21 formed upon the edge of the box 6. The bolt 18 extends through a slot 22 which is formed in an extension 23 formed upon the side 17.

The shaft 9 has a collar 24 formed thereupon, upon the inner edge of which collar is formed a pair of diametrically opposed lugs 25. The lugs 25 are adapted for seating in openings 26 which are formed in the hub 11 of the valve member 10 for rotating the valve member synchronously with the rotation of the shaft 9. A clutch collar 27 is mounted upon the shaft 9 and positioned exteriorly of the casing 6. The clutch collar 27 is detachably connected to the shaft 9 for rotation therewith by means of a cotter pin 28. The clutch collar 27 has a pair of outwardly extending lugs or projections 29 formed thereon which are adapted for seating in recesses 30 formed in the hub 31 of the sprocket 32 for connecting the clutch collar to the sprocket for rotation therewith, and consequently for rotating the shaft 9 by the rotation of the sprocket 32. The end of the shaft which projects outwardly from the sprocket 32 is externally screw threaded as shown at 33, and a wing nut 34 is mounted upon this screw threaded end for holding the sprocket 32 in engagement with the clutch collar 27. A sprocket chain 35 travels about the sprocket 32, and about a sprocket 36 which is mounted upon the drive shaft 3.

A bracket 37 is connected to the supporting structure 38′ of the plow and is provided with a slot 38 which inclines downwardly as shown in Fig. 1. A stud 39, which has a rectangular portion 40 formed thereupon extends through the slot 38, and the rectangular portion 40 of the stud is positioned within the slot, so as to prevent rotation of the stud within the slot. A collar 41 is mounted upon the stud 39 and rotatably supports an idler sprocket 42 about which the sprocket chain 35 travels. The outer end of the stud 39 is externally screw threaded, and a wing nut 43 is mounted thereon for preventing accidental removal of the sprocket 42 from off the collar 41 and for clamping the collar in engagement with the outer surface of the bracket 37. By adjusting the stud 39 within the slot 38 the tension of the chain 35 may be regulated, and when different sized sprockets 32 are employed for changing the speed of rotation of the shaft 9 and the valve element 10, the idler can be adjusted for the proper tensioning of the sprocket chain. The bracket 37 has an arcuate projection 44 formed thereon which guides the upper run of the sprocket chain 35.

By changing the sprocket 32, to different sizes, the speed of rotation of the shaft 9 may be regulated, and consequently the time of dropping the seeds by the rotary valve member may be regulated as desired and this feature may also be further regulated by the provision of valve members having different numbers of blades formed thereon. For instance in Fig. 4 a valve member is illustrated having four blades while in Fig. 6 a valve member is illustrated having five blades. It is to be understood that any number of blades may be formed upon the valve member without departing from the spirit of this invention, and also that any size sprocket desired may be used in lieu of the size of sprocket 32.

In the operation of the improved attachment for cotton planters; the seeds will be deposited into the hopper or spout 5 by the operation of the ordinary seed dispensing mechanism of the plow and the seeds will be deposited in the spaces between the blade 12 of the rotary valve member 10 and held from falling downwardly through the spout into the ground. When the space between the blades, in which the seeds are retained is positioned directly over the opening 13, the seeds will fall out of the box 6 into the furrow made by the furrow opening 2 structure 14. The rotary valve member will cause the seeds to accumulate within the box 6, and instead of sowing the seed, it will deposit them in hills at spaced intervals. The rotary valve is only adapted for use in connection with cotton, and when it is desired to plant corn, or sow the cotton in rows, the valve member may be removed from the box or casing 6, and the seeds allowed to fall straight downwardly through the same.

From the foregoing description taken in connection with the accompanying drawings the advantages of construction and of the method of operation of the improved planter will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. The combination with a planter including a supporting structure, seed dispensing means and means for operating said seed dispensing means, of a sprocket operatively connected to said operating means, a casing for receiving the seeds from said dispensing means, a shaft mounted in said casing, a valve member carried by said shaft, a sprocket mounted upon said shaft, a chain connecting said sprocket for rotating said shaft and valve member upon operation of said operating means, an adjustable means for regulating the tension of said chain for permitting the changing of said sprockets for altering the speed of rotation of said shaft and said valve member for regulating the deposit of seed from said casing.

2. The combination with a planter including a supporting structure, seed dispensing means and means for operating said seed dispensing means, of a sprocket operatively connected to said operating means, a casing carried by said supporting structure for receiving seeds from said dispensing means, a shaft mounted in said casing, a valve member carried by said shaft, said valve member including a hub and a plurality of radiating blades connected to said hub, a sprocket mounted upon said shaft, a chain connecting said sprocket for rotating said shaft and valve member upon operation of said operating means, one side of said casing being detachably connected to the body of the casing whereby said valve member may be removed from said shaft and the interior of said casing for replacing it with another valve member as desired.

3. The combination with a planter including a supporting structure, seed dispensing means, and means for operating said seed dispensing means, of a rotary valve for receiving seed from said seed dispensing means, a sprocket operatively connected to said operating means, a second sprocket operatively connected to said valve, a chain passing about said sprockets, a bracket attached to said supporting structure and provided with an inclined slot, a pin mounted in said slot, means for holding said pin in adjusted positions within said slot, an idler sprocket rotatably carried by said pin and engaging one run of said sprocket chain for holding said chain taut, said slot permitting of adjustment of said idler to regulate said chain for different size sprockets.

4. The combination with a planter including a supporting structure, a seed dispensing means, and means for operating said seed dispensing means, of a rotary valve for receiving seed from said seed dispensing means, a sprocket operatively connected to said operating means, a second sprocket operatively connected to said valve, a sprocket chain passing about said sprocket, a bracket attached to said supporting structure and provided with an inclined slot, a pin mounted in said slot, means for holding said pin in adjusted position within said slot, an idler sprocket rotatably carried by said pin and engaging one run of said sprocket chain for holding said sprocket chain taut, said slot permitting of adjustment of said idler to regulate said chain for different size sprockets, an arcuate guide extension formed upon said bracket and engaging the run of said chain opposite to that engaged by said idler.

In testimony whereof I affix my signature in presence of two witnesses.

WILLIAM D. HEFLIN.

Witnesses:
S. R. PATTEN,
J. P. STOVALL.

Copies of this patent may be obtained for five cents each, by addressing the "Commissioner of Patents, Washington, D. C."